US010656419B2

(12) United States Patent
Han et al.

(10) Patent No.: US 10,656,419 B2
(45) Date of Patent: May 19, 2020

(54) HEAD-UP DISPLAY APPARATUS INTEGRATED WITH CLUSTER

(71) Applicant: HYUNDAI MOBIS CO., LTD., Seoul (KR)

(72) Inventors: Sang Hoon Han, Seoul (KR); Jae Ho Oh, Yongin-si (KR); Chan Young Yoon, Gwangmyeong-si (KR); Seok Bong Kang, Suwon-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 15/858,318

(22) Filed: Dec. 29, 2017

(65) Prior Publication Data
US 2019/0162965 A1 May 30, 2019

(30) Foreign Application Priority Data
Nov. 30, 2017 (KR) .................. 10-2017-0162674

(51) Int. Cl.
G02B 27/01 (2006.01)
B60K 35/00 (2006.01)
B60K 37/04 (2006.01)
B60Q 9/00 (2006.01)
G06F 3/041 (2006.01)

(52) U.S. Cl.
CPC .......... G02B 27/0149 (2013.01); B60K 35/00 (2013.01); B60K 37/04 (2013.01); G02B 27/0101 (2013.01); B60K 2370/1529 (2019.05); B60K 2370/334 (2019.05); B60K 2370/66 (2019.05); B60K 2370/67 (2019.05); B60Q 9/00 (2013.01); G02B 2027/0123 (2013.01); G02B 2027/0141 (2013.01); (Continued)

(58) Field of Classification Search
CPC ........ G02B 27/0149; G02B 2027/0123; G02B 2027/0141; G02B 2027/0154; B60K 35/00; B60K 2350/2052; B60K 2350/405; B60Q 9/00; G06F 3/041
See application file for complete search history.

(56) References Cited

U.S. PATENT DOCUMENTS 9,715,110 B1 * 7/2017 Brown ............... G02B 27/0101
2017/0153451 A1 * 6/2017 Brandt .................. B60K 35/00
(Continued)

FOREIGN PATENT DOCUMENTS

JP 2012-254707 A 12/2012
JP WO2014-112054 A1 7/2014
(Continued)

OTHER PUBLICATIONS

Office Action of corresponding Japanese Patent Application No. 2018-098522—6 pages (dated Apr. 23, 2019).

Primary Examiner — Charles V Hicks
(74) Attorney, Agent, or Firm — Knobbe Martens Olson & Bear LLP

(57) ABSTRACT

Disclosed herein is a head-up display apparatus integrated with a cluster. The head-up display apparatus integrated with the cluster may include a cluster housing unit provided in front of a driver, a cover unit mounted to a top of the cluster housing unit and having a display unit, and a combiner unit rotatably coupled to the cover unit, light generated in the cluster housing unit being irradiated onto the combiner unit to form an image.

14 Claims, 10 Drawing Sheets

(52) U.S. Cl.
CPC ........... *G02B 2027/0154* (2013.01); *G02B 2027/0159* (2013.01); *G02B 2027/0169* (2013.01); *G06F 3/041* (2013.01)

(56) References Cited

U.S. PATENT DOCUMENTS

| | | | |
|---|---|---|---|
| 2017/0237882 A1* | 8/2017 | Shiohara | H04N 5/2254 348/148 |
| 2017/0293199 A1* | 10/2017 | Kim | H04N 5/2252 |
| 2018/0065482 A1* | 3/2018 | Yagyu | G02B 27/01 |
| 2018/0188535 A1* | 7/2018 | Quiroz de la mora | G02B 27/0149 |

FOREIGN PATENT DOCUMENTS

| | | |
|---|---|---|
| JP | 2014-142474 A | 8/2014 |
| JP | 2014-522781 A | 9/2014 |
| JP | 2015-143970 A | 8/2015 |
| JP | 2016-101771 A | 6/2016 |
| JP | 2017-178131 A | 10/2017 |
| JP | 2017-186008 A | 10/2017 |

\* cited by examiner

HEAD-UP DISPLAY APPARATUS INTEGRATED WITH CLUSTER

CROSS-REFERENCES TO RELATED APPLICATIONS

The present application claims priority to Korean application number 10-2017-0162674, filed on Nov. 30, 2017, which is incorporated by reference in its entirety.

BACKGROUND OF THE INVENTION

The present invention relates to a head-up display apparatus integrated with a cluster, and more particularly, to a head-up display apparatus integrated with a cluster which is capable of expanding the field of vision of a driver and enhancing space utilization.

In general, a head-up display (HUD) is a system that displays a virtual image including various vehicle information on a windshield glass of a vehicle so as to enable a driver to check the vehicle information while keeping eyes forward when driving the vehicle.

A combiner-type head-up display is typically configured such that a combiner retracted in the vehicle is deployed when needed. According to the orientation of an optical apparatus corresponding to space for installation of the head-up display in the vehicle, there are a horizontal combiner head-up display and a vertical combiner head-up display.

The cluster is provided on a front around a driver's seat of the vehicle to display various information related to the vehicle driving, information on the operation status of various devices including an engine, a warning message and the like, with characters or figures. The cluster is equipped with a plurality of gauges and indicators.

For example, there are provided a speedometer indicating the instantaneous speed of the vehicle, a tripmeter, an odometer, an RPM speedometer indicating the revolution per minute of the engine, a fuel gauge indicating the residual quantity of fuel, a coolant thermometer indicating the temperature of coolant and others. In addition, a brake warning light, a seat-belt warning light, an anti-lock brake system (ABS) warning light and the like are displayed.

Conventionally, necessary information is distributed to two products, namely, the head-up display and the cluster when the vehicle is driven, thus blocking a driver's field of vision. Further, since the respective products are independently installed, a structure is complicated and space utilization is poor.

The related art of the present invention is disclosed in Korean Patent No. 10-2003-0000536 published on Jan. 6, 2003 and entitled "Head-up Display Apparatus for Vehicle".

SUMMARY OF THE INVENTION

Embodiments of the present invention are directed to a head-up display apparatus integrated with a cluster, in which a display unit and a combiner unit are integrated with each other, thus being capable of expanding the field of vision of a driver and enhancing space utilization.

In one embodiment, a head-up display apparatus integrated with a cluster may include: a cluster housing unit provided in front of a driver; a cover unit mounted to a top of the cluster housing unit, and having a display unit; and a combiner unit rotatably coupled to the cover unit, light generated in the cluster housing unit being irradiated onto the combiner unit to form an image.

The cover unit may include a mounting frame in which the display unit is provided; a cover body covering a top of the mounting frame; and a guide unit coupled to the mounting frame, and providing a path of light reflected from a screen unit provided in the cluster housing unit.

The display unit may include a bracket coupled to the mounting frame; an optical substrate coupled to the bracket to generate light; an optical tunnel through which the light irradiated from the optical substrate passes; and a panel covering the optical tunnel, and coupled to the mounting frame.

The optical substrate may be a light emitting diode (LED) substrate.

The panel may have a structure of a touch panel.

Warning light may be displayed on the panel.

Turn signal light may be displayed on the panel.

The combiner unit may include a combiner body at which light irradiated from the cluster housing unit arrives; a hinge coupled to the cover unit; and a combiner holder coupled with the combiner body and rotatably installed at the hinge.

A rotating shaft may be provided on the hinge, and an insert hole may be formed in the combiner holder such that the rotating shaft may be inserted into the insert hole.

The combiner body may include a first region formed under a central portion of the combiner body so that the light irradiated from the cluster housing unit reaches the first region; a second region formed above the first region so that the light reaches the second region; a third region formed on a left side of the second region with respect to a front of a driver's field of vision so that the light reaches the third region; and a fourth region formed on a right side of the second region so that the light reaches the fourth region.

The first region may display at least one of information including a vehicle speed, a revolution per minute (RPM) of an engine, a fuel condition, and a vehicle status.

The second region may display a fault or failure of a vehicle system.

The third region may display information about an advanced driver assistance system (ADAS).

The fourth region may display information about an audio, video, and navigation (AVN) integrating module and vehicle setting.

In another embodiment, the combiner body may include a first region formed in a central portion of the combiner body so that the light irradiated from the cluster housing unit reaches the first region; a second region formed on a left side of the first region so that the light reaches the second region; and a third region formed on a right side of the first region so that the light reaches the third region.

Information by light reaching the first region, the second region and the third region may be changeable.

The first region may display at least one of information about a vehicle speed, a revolution per minute of an engine, a fuel condition and a vehicle status, information about an advanced driver assistance system, and information an AVN module.

The second region may display information about voice recognition and information about danger warning.

DESCRIPTION OF SPECIFIC EMBODIMENTS

Hereafter, a head-up display apparatus integrated with a cluster in accordance with embodiments of the invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
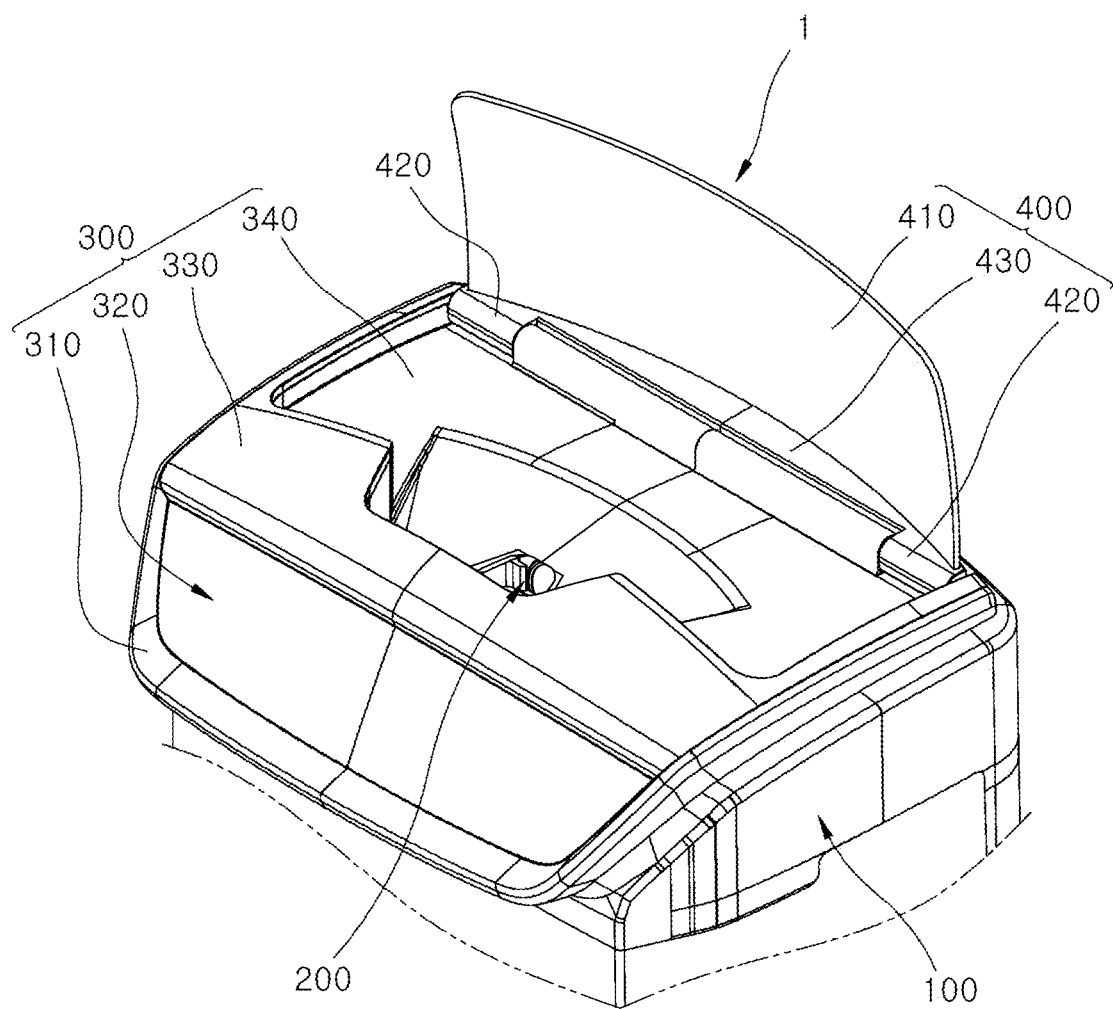
FIG. 1 is a perspective view illustrating a head-up display apparatus integrated with a cluster according to an embodiment of the present invention.
Figure 2:
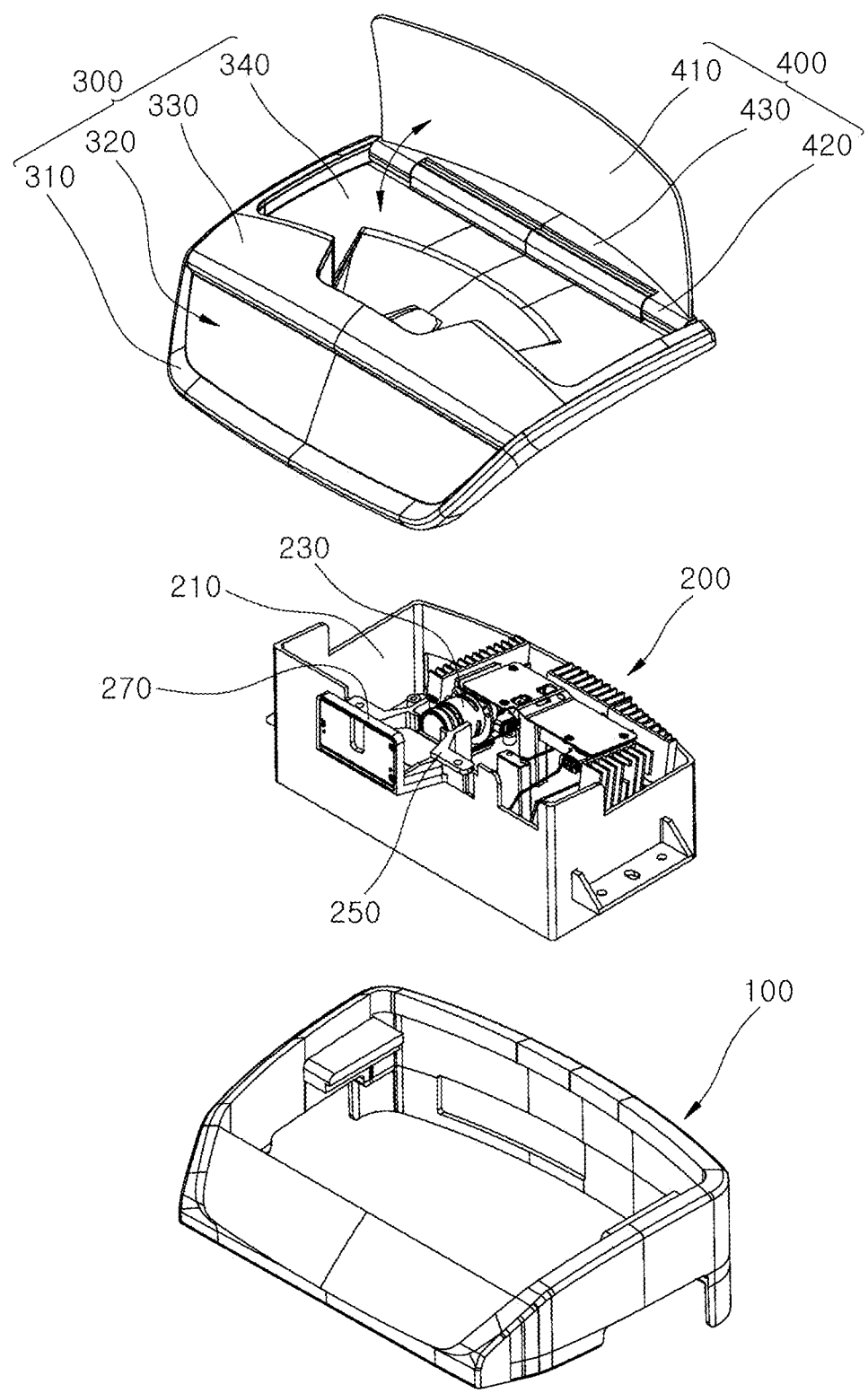
FIG. 2 is an exploded view illustrating the head-up display apparatus integrated with the cluster according to the embodiment of the present invention.
Figure 3:
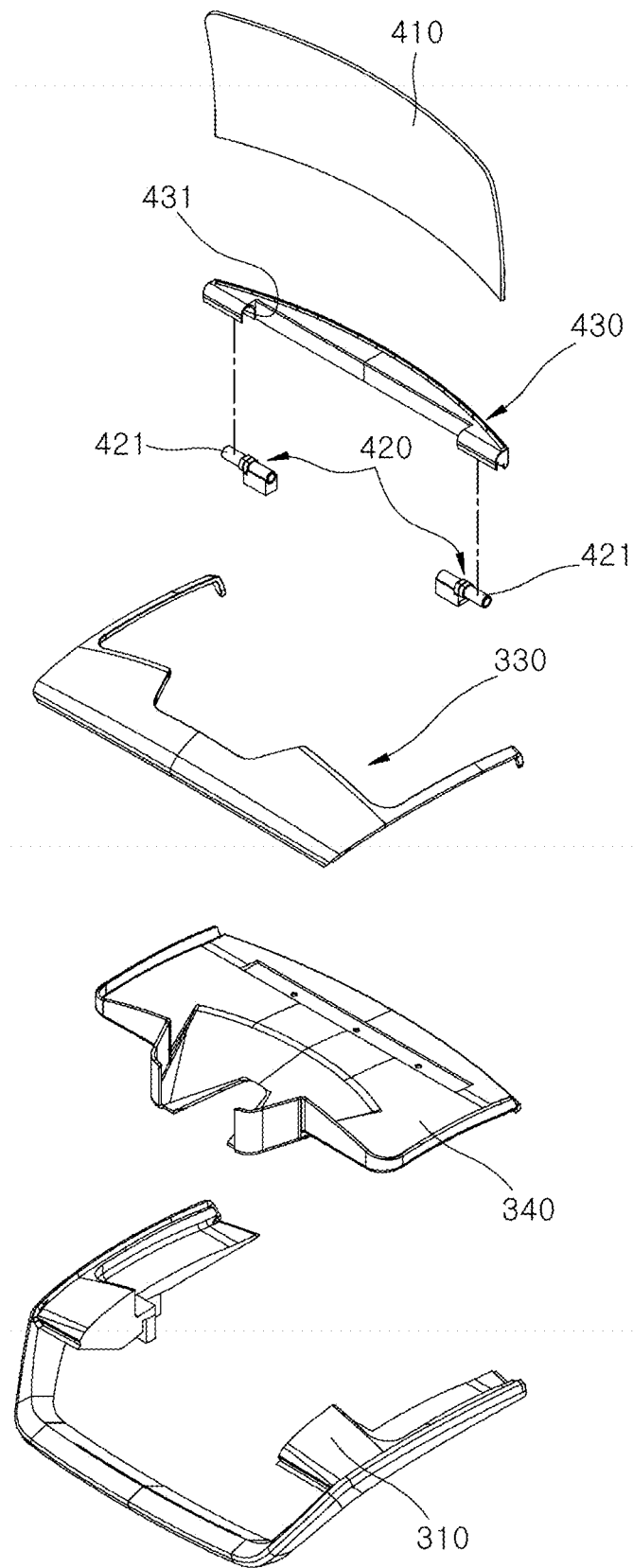
FIG. 3 is an exploded view illustrating a cover unit and a combiner unit according to the embodiment of the present invention.
Figure 4:
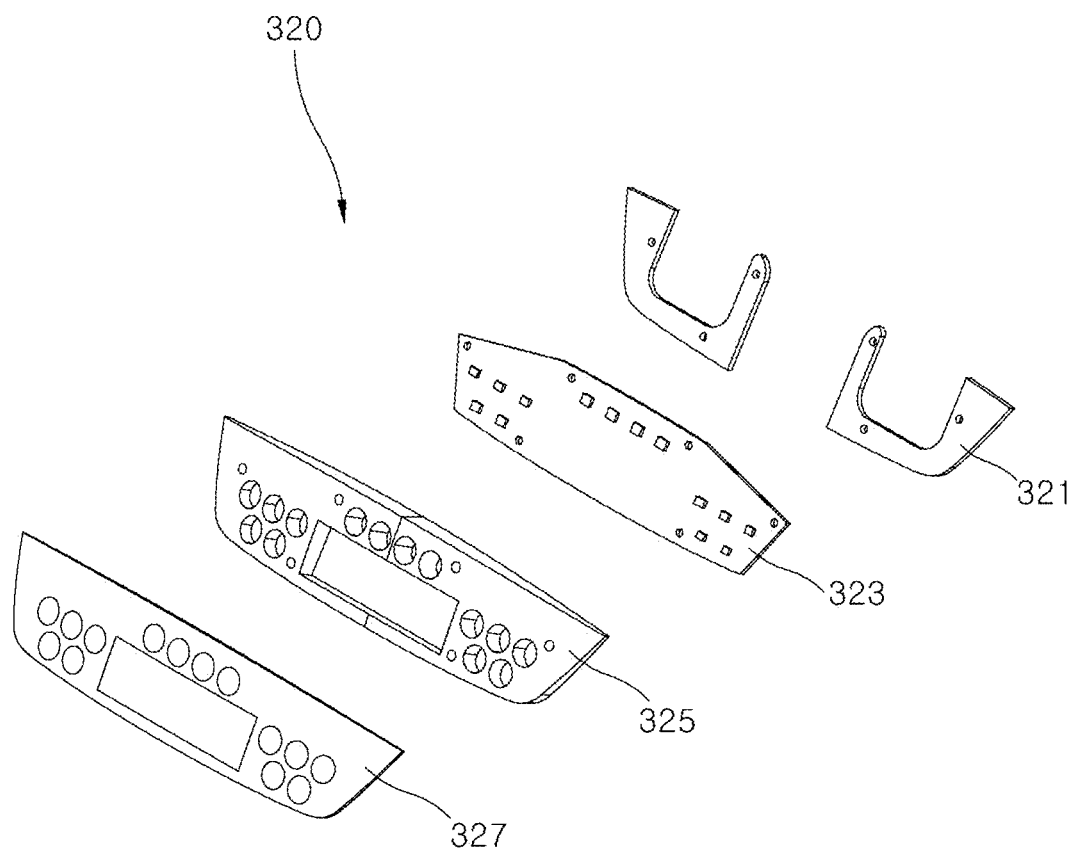
FIG. 4 is an exploded view illustrating a display unit according to the embodiment of the present invention.
Figure 5:
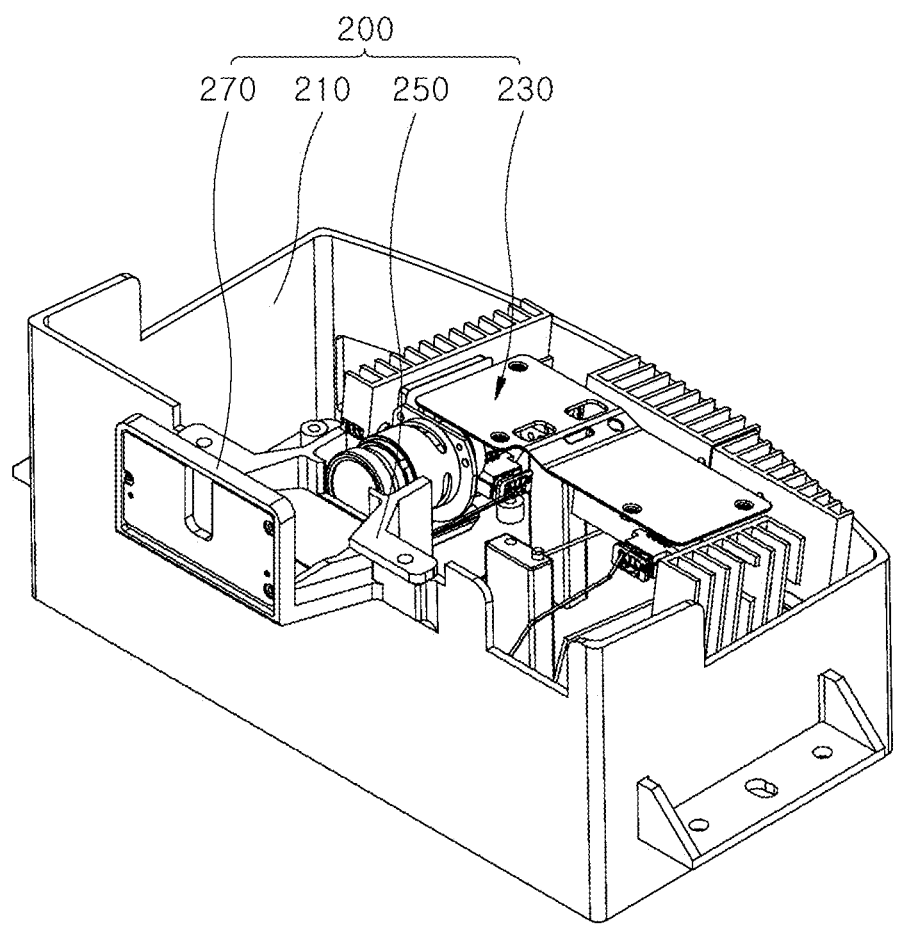
FIG. 5 is a perspective view illustrating an optical module unit according to the embodiment of the present invention.
Figure 6:
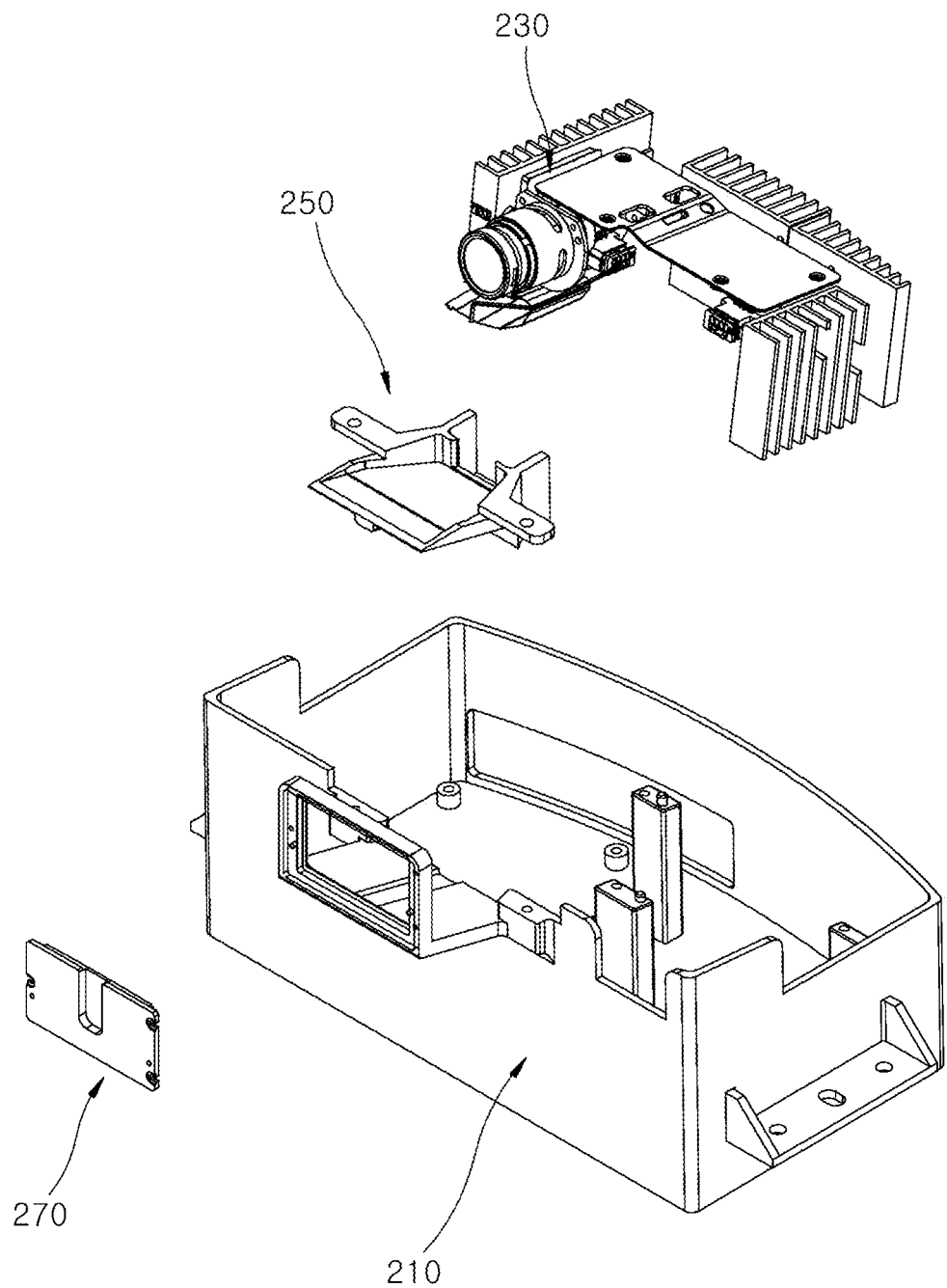
FIG. 6 is an exploded view illustrating the optical module unit according to the embodiment of the present invention.
Figure 7:
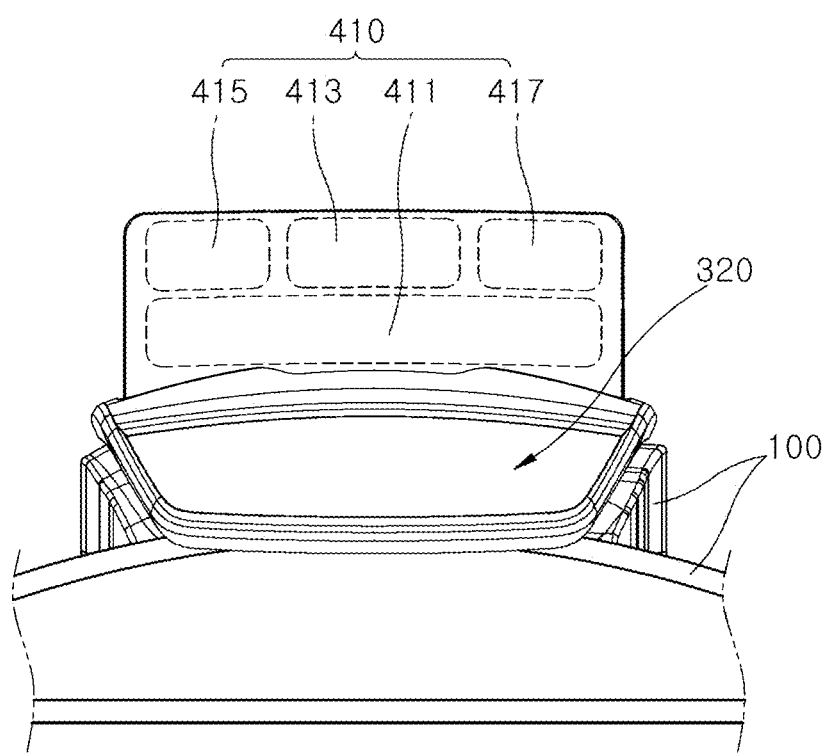
FIG. 7 is a front view illustrating a combiner body according to the embodiment of the present invention.
Figure 8:
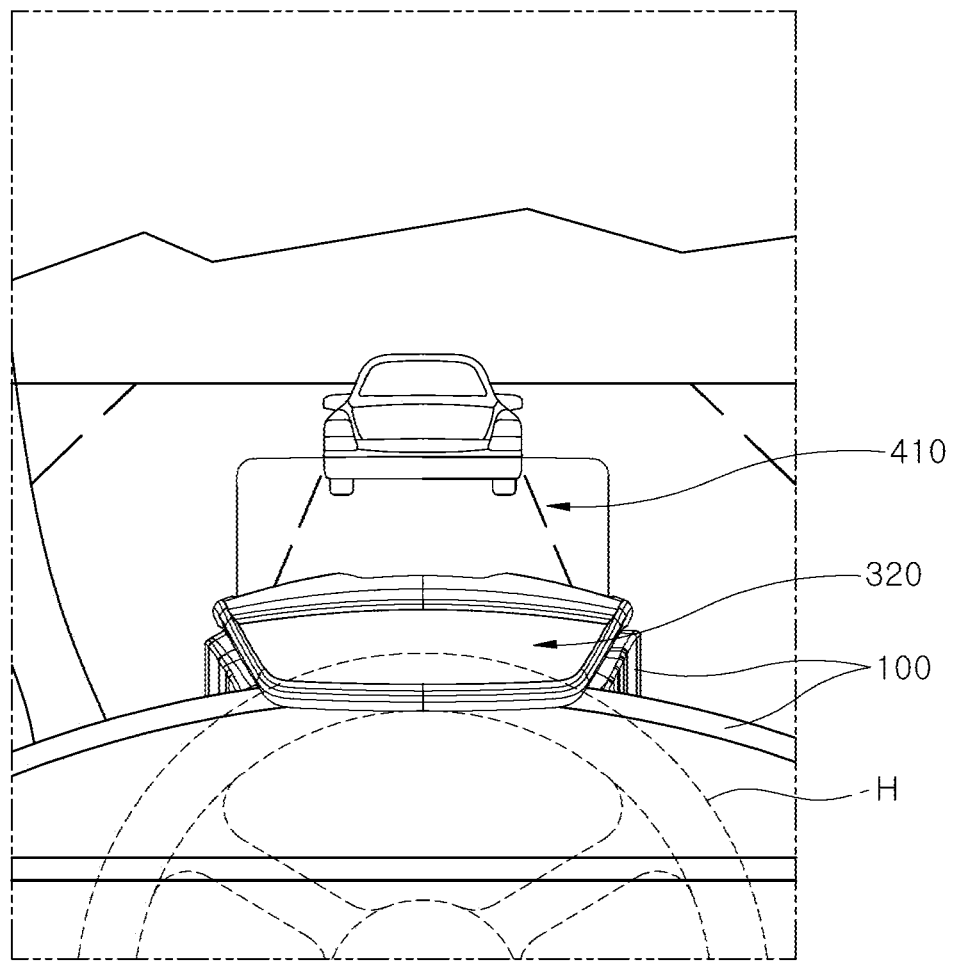
FIG. 8 is a front view illustrating the head-up display apparatus integrated with the cluster according to the embodiment of the present invention.
Figure 9:
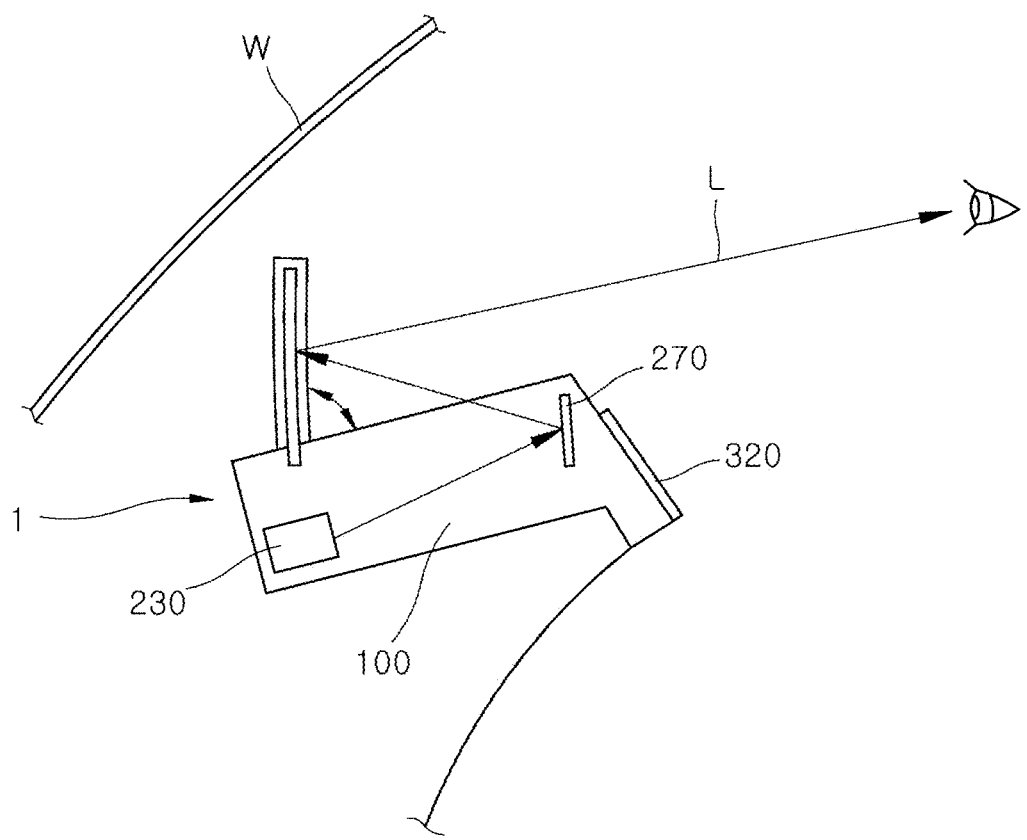
FIG. 9 is a conceptual diagram illustrating the head-up display apparatus integrated with the cluster according to the embodiment of the present invention.

FIG. 1 is a perspective view illustrating a head-up display apparatus integrated with a cluster according to an embodiment of the present invention. FIG. 2 is an exploded view illustrating the head-up display apparatus integrated with the cluster according to the embodiment of the present invention. FIG. 3 is an exploded view illustrating a cover unit and a combiner unit according to the embodiment of the present invention. FIG. 4 is an exploded view illustrating a display unit according to the embodiment of the present invention. FIG. 5 is a perspective view illustrating an optical module unit according to the embodiment of the present invention. FIG. 6 is an exploded view illustrating the optical module unit according to the embodiment of the present invention. FIG. 7 is a front view illustrating a combiner body according to the embodiment of the present invention. FIG. 8 is a front view illustrating the head-up display apparatus integrated with the cluster according to the embodiment of the present invention. FIG. 9 is a conceptual diagram illustrating the head-up display apparatus integrated with the cluster according to the embodiment of the present invention.

Referring to FIGS. 1 to 9, the head-up display apparatus 1 integrated with the cluster according to the embodiment of the present invention includes a cluster housing unit 100, an optical module unit 200, a cover unit 300, and a combiner unit 400.

Referring to FIGS. 1 to 9, the cluster housing unit 100 according to the embodiment of the present invention is installed at a position (left side of FIG. 9) in front of a driver.

The optical module unit 200 that will be described later is installed in the cluster housing unit 100. Light L generated in the optical module unit 200 arrives at the combiner unit 400, particularly a combiner body 410, so information about the vehicle is created in the form of an image.

Referring to FIG. 2, the cluster housing unit 100 according to the embodiment of the present invention has an opening at an upper position thereof (see FIG. 2), and the cover unit 300 that will be described below in detail covers the opening that is formed in the cluster housing unit 100.

Referring to FIGS. 2, 5 and 6, the optical module unit 200 according to the embodiment of the present invention is installed in the cluster housing unit 100, and includes an optical-module housing unit 210, a light generating unit 230, a lens cover unit 250, and a screen unit 270.

Referring to FIG. 6, the optical-module housing unit 210 is coupled to the cluster housing unit 100 to be placed in the cluster housing unit 100.

The light generating unit 230 is coupled to the optical-module housing unit 210 to generate light L in a digital light processing (DLP) manner and thereby irradiate the light L towards the screen unit 270 that will be described later.

A digital micro-mirror device (DMD) is used in the light generating unit 230.

According to the present invention, the light generating unit 230 generates the light L in the DLP manner. However, it is possible to generate the light L in various manners, for example, by using a liquid crystal display (LCD), without being limited to the DLP manner.

Referring to FIGS. 5 and 6, the lens cover unit 250 according to the embodiment of the present invention is coupled to both the light generating unit 230 and the optical-module housing unit 210 to provide a path of the light L that is irradiated from the light generating unit 230.

Referring to FIGS. 5 and 6, the screen unit 270 according to the embodiment of the present invention is disposed to face the light generating unit 230, and is mounted to the optical-module housing unit 210. The light L irradiated from the light generating unit 230 reaches the screen unit.

The screen unit 270 according to the embodiment of the present invention reflects the light L transmitted from the light generating unit 230 to cause the light L to reach the combiner unit 400 that will be described later, particularly the combiner body 410.

According to the present invention, the screen unit 270 is disposed on a moving path of the light L irradiated from the light generating unit 230 to reflect the light L. However, the invention may be modified in various ways without being limited thereto. That is, the light L may be projected depending on a position of the optical-module housing unit 210 at which the screen unit 270 is installed.

Referring to FIGS. 2 and 3, the cover unit 300 according to the embodiment of the present invention is mounted to a top of the cluster housing unit 100.

Referring to FIG. 2, the cover unit 300 according to the embodiment of the present invention includes a mounting frame 310, a display unit 320, and a cover body 330.

Referring to FIGS. 2 and 3, the display unit 320 is mounted to the mounting frame 310 according to the embodiment of the present invention. The mounting frame is coupled to a top (see FIG. 2) of the cluster housing unit 100.

Referring to FIGS. 2 and 9, a portion of the mounting frame 310 to which the display unit 320 is mounted is downwardly inclined towards a driver so that the display unit 320 is inclinedly installed.

Thereby, when a driver keeps eyes forwards (left side of FIG. 9) while driving, it is possible to expand a viewing angle with respect to the display unit 320.

Referring to FIGS. 3 and 4, the display unit 320 according to the embodiment of the present invention is installed in the mounting frame 310, and includes a bracket 321, an optical substrate 323, an optical tunnel 325, and a panel 327.

The bracket 321 is coupled to the mounting frame 310, and is formed in the shape of 'U'. The bracket may comprise a plurality of brackets. Each bracket 321 is coupled with the mounting frame 310, the optical substrate 323, the optical tunnel 325, and the panel 327.

This has the effect that the optical substrate 323, the optical tunnel 325, and the panel 327 are fixed to the mounting frame 310. The bracket 321, the mounting frame 310, the optical substrate 323, the optical tunnel 325, and the panel 327 are coupled to each other via a fastening member, such as a bolt.

The optical substrate 323 according to the embodiment of the present invention is coupled to the bracket 321 to generate the light L. The optical substrate 323 may be formed as a light emitting diode (LED) substrate.

The optical tunnel 325 according to the embodiment of the present invention is installed between the panel 327 and the optical substrate 323 that will be described later. A hole is formed in the optical tunnel to allow the light L generated and irradiated from the optical substrate 323 to pass through the optical tunnel.

A plurality of holes is provided. Thus, the light L generated from the optical substrate 323 passes through the holes and then reaches the panel 327. In addition, a driver may check information displayed on the panel 327 through the holes.

Referring to FIG. 4, the panel 327 according to the embodiment of the present invention is coupled to the mounting frame 310 while covering the optical tunnel 325, and is located to be nearer to a driver as compared to the optical substrate 323, the optical tunnel 325, and the bracket 321.

The light L generated from the optical substrate 323 finally reaches the panel 327. Thus, a driver may visually recognize information via the light L reaching the panel 327.

Specifically, a warning light is displayed on the panel 327 to cause a driver to check the malfunction of the vehicle. In addition, a turn signal light is displayed on the panel 327.

The panel 327 according to the embodiment of the present invention has the structure of a touch panel.

Thus, a driver touches the panel 327 with his or her finger, and the panel 327 recognizes the driver's input to transmit an electric signal inputted from the driver to a control unit (not shown). The control unit (not shown) processes an associated function based on the transmitted electric signal.

The cover body 330 according to the embodiment of the present invention is coupled to cover the top of the mounting frame 310. The cover body is mounted to a top (see FIG. 6) of the optical module unit 200, particularly the screen unit 270.

Therefore, the cover body prevents foreign matter including dust from entering the screen unit 270, and protects the screen unit 270 from external impacts.

Referring to FIGS. 2 and 3, a guide unit 340 according to the embodiment of the present invention is coupled to the mounting frame 310 to provide a path of light L reflected from the screen unit 270 that is installed in the cluster housing unit 100.

The guide unit 340 is placed on a top (see FIG. 2) of the optical-module housing unit 210, particularly the light generating unit 230 to face the lens cover unit 250.

Thereby, a path is provided in a bottom (see FIG. 3) of the guide unit 340 so that light L irradiated from the light generating unit 230 along with the lens cover unit 250 reaches the screen unit 270, while a path is provided in a top (see FIG. 3) of the guide unit 340 so that light L reflected from the screen unit 270 reaches the combiner unit 400, particularly the combiner body 410.

The guide unit 340 according to the embodiment of the present invention is coupled with the lens cover unit 250 via a fastening member or the like.

Referring to FIGS. 2 and 3, the combiner unit 400 according to the embodiment of the present invention is rotatably coupled with the cover unit 300, so that light L generated from the interior of the cluster housing unit 100 is irradiated onto the combiner unit to form an image.

The combiner unit 400 according to the embodiment of the present invention includes the combiner body 410, a hinge 420, and a combiner holder 430.

Referring to FIG. 4, light L irradiated from the interior of the cluster housing unit 100 reaches the combiner body 410. The combiner body is disposed to face the screen unit 270.

An aspherical lens may be applied to the combiner body 410. This enhances the focus accuracy of a subject to allow a vehicle information image to be clearly displayed by irradiated light L.

Referring to FIG. 7, the combiner body 410 according to the embodiment of the present invention includes a first region 411, a second region 413, a third region 415, and a fourth region 417.

The first region 411 is formed under a central portion of the combiner body 410 (see FIG. 7), the second region 413 is formed above the first region 411 (see FIG. 7), the third region 415 is formed on a left side of the second region 413 (see FIG. 7) and the fourth region 417 is formed on a right side of the second region 413 (see FIG. 7) with respect to a front of a driver's field of vision.

Referring to FIG. 7, the first region 411 of the combiner body 410 according to the embodiment of the present invention displays at least one of information including a vehicle speed, the revolution per minute of the engine, a fuel condition, and a vehicle status.

Referring to FIG. 7, the second region 413 of the combiner body 410 according to the embodiment of the present invention displays information about the fault or failure of a vehicle system.

Referring to FIG. 7, the third region 415 of the combiner body 410 according to the embodiment of the present invention displays information about an advanced driver assistance system.

Owing to the advanced driver assistance system, it is possible to detect both an object and a vehicle environment and to stably predict traffic conditions.

The advanced driver assistance system includes an autonomous emergency braking (AEB) system that autonomously reduces the speed of the vehicle or stops the vehicle even if a driver does not step on a braking device when there is a possibility of collision, a lane keep assist system (LAKS) that adjusts a driving direction to maintain a lane in the event of lane departure, an advanced smart cruise control (ASCC)) that maintains a distance from a vehicle in front while running at a preset speed, an active blind spot detection (ABSD) system that detects the risk of collision in a blind spot to safely perform a lane change, and an around view monitoring system that visually shows a situation around the vehicle.

Referring to FIG. 7, the fourth region 417 of the combiner body 410 according to the embodiment of the present invention displays information about AVN and vehicle setting. In this regard, the AVN means an audio, video, and navigation integrating module.

Referring to FIG. 3, the hinge 420 according to the embodiment of the present invention is coupled to the cover unit 300. A plurality of hinges may be provided. A rotating shaft 421 extends outwards form the hinge.

The combiner holder 430 that will be described later is coupled to the rotating shaft 421. As the combiner holder 430 rotates about the rotating shaft 421 clockwise or counterclockwise, the combiner body 410 opens or closes the cluster housing unit 100.

Referring to FIG. 3, the combiner holder 430 according to the embodiment of the present invention is coupled to the combiner body 410 and is rotatably joined to the hinge 420.

An insert hole 431 is formed in the combiner holder 430, so that the hinge 420, particularly the rotating shaft 421 is inserted into the insert hole 431.

The operating principle and effect of the head-up display apparatus 1 integrated with the cluster configured as such will be described below.

Referring to FIGS. 1 to 9, the head-up display apparatus 1 integrated with the cluster according to the embodiment of the present invention includes the cluster housing unit 100, the optical module unit 200, the cover unit 300, and the combiner unit 400.

Referring to FIGS. 8 and 9, the cluster housing unit 100 is installed in front of a driver. The optical module unit 200 is installed in the cluster housing unit 100. Specifically, the optical-module housing unit 210 is installed in the cluster housing unit 100.

The light L is generated from the light generating unit 230 that is coupled to the optical-module housing unit 210, passes between the guide unit 340 mounted to the cluster housing unit 100 and the lens cover unit 250 coupled to the light generating unit 230 while facing the guide unit 340, and then reaches the screen unit 270.

The light L irradiated from the light generating unit 230 is reflected from the screen unit 270 to change its moving path and then is irradiated onto the first region 411, the second region 413, the third region 415, and the fourth region 417 according to the information that is to be transmitted to a driver.

Referring to FIG. 4, the display unit 320 includes the bracket 321, the optical substrate 323, the optical tunnel 325, and the panel 327. The bracket 321 is coupled to the mounting frame 310 along with the optical tunnel 325 and the optical substrate 323, and prevents the display unit 320 from being removed from the mounting frame 310.

The light L generated from the optical substrate 323 according to the embodiment of the present invention passes through the optical tunnel 325 and then reaches the panel 327.

Thereby, information about the warning light or the turn signal light displayed on the panel 327 may be visually transmitted to a driver. In addition, since the panel 327 has the structure of the touch panel, the driver may input a signal by touching the panel 327.

Referring to FIGS. 2 and 3, the hinge 420 is inserted into the combiner holder 430, particularly the insert hole 431 formed in the combiner holder 430. As the combiner holder 430 rotates, the combiner body 410 coupled with the combiner holder 430 rotates clockwise or counterclockwise.

The combiner unit 400 rotates to open or close the cluster housing unit 100 by power transmitted from a separate drive unit (not shown).

Referring to FIG. 9, the cluster housing unit 100 according to the embodiment of the present invention is installed at a position in front of a driver, and gives a driver a wide-open view in front due to the combiner unit 400 that is rotatably assembled with the display unit 320 and the cluster housing unit 100.

In addition, it is possible to enhance driving stability due to the wide-open view in front.

Referring to FIG. 8, the display unit 320 and the combiner unit 400 according to the embodiment of the present invention have the effect of reducing a space occupied by a conventional cluster unit (not shown) and simplifying a structure.

Referring to FIG. 3, since the mounting frame 310 according to the embodiment of the present invention is downwardly inclined towards a driver (left side of FIG. 3), a driver's ability to recognize the display unit 320 is improved.

Referring to FIG. 7, since information required to drive the vehicle is visually displayed on the display unit 320, the combiner unit 400, particularly the combiner body 410 according to the embodiment of the present invention, a portion in which the conventional cluster is installed may be used for other purposes and thereby space utilization is improved.

Hereinafter, the configuration, operating principle and effect of a head-up display apparatus integrated with a cluster according to another embodiment of the present invention will be described.

Figure 10:
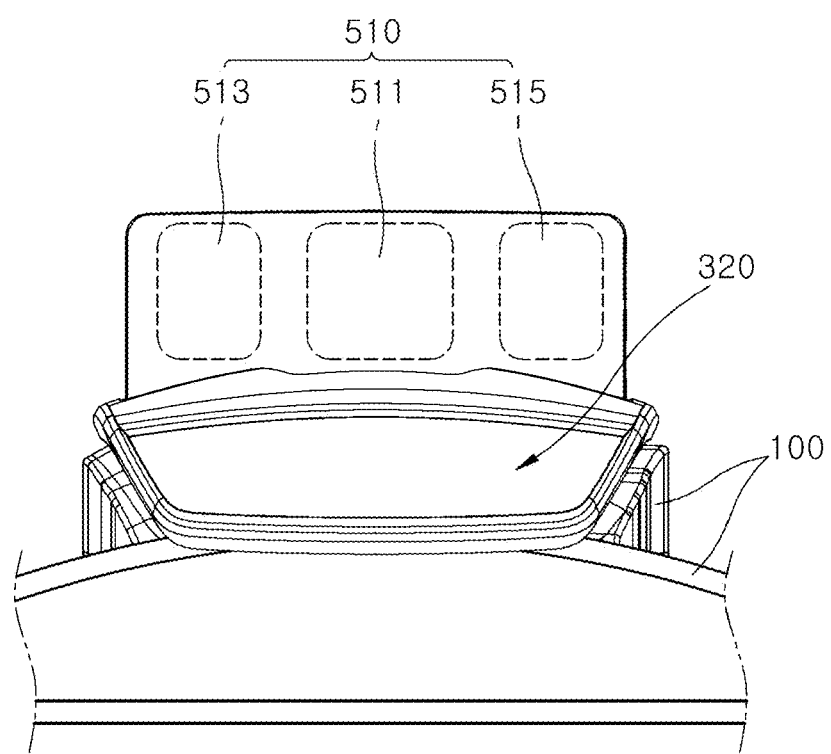
FIG. 10 is a front view illustrating a combiner body according to another embodiment of the present invention.

FIG. 10 is a front view illustrating a combiner body according to another embodiment of the present invention.

The combiner body 510 according to another embodiment of the present invention has a first region 511, a second region 513, and a third region 515.

The first region 511 is formed in a central portion (see FIG. 10) of the combiner body 510, the second region 513 is formed on a left side (see FIG. 10) of the first region 511, and the third region 515 is formed on a right side (see FIG. 10) of the first region 511.

Referring to FIG. 10, information by light L reaching the first region 511, the second region 513 and the third region 515 of the combiner body 510 according to the embodiment of the present invention may be changed.

The information displayed on the first region 511, the second region 513, and the third region 515 is changed according to a driver's need, thus improving the convenience of operation.

According to another embodiment of the present invention, the first region 511 of the combiner body 510 displays at least one of information about a vehicle speed, the revolution per minute of an engine, a fuel condition and a vehicle status, information about an advanced driver assistance system, and information an AVN module.

Referring to FIG. 10, the second region 513 of the combiner body 510 according to another embedment of the present invention displays information about voice recognition and information about danger warning.

According to another embodiment of the present invention, information about the fault or failure of a vehicle system is displayed on the second region 513. However, without being limited thereto, the information about the fault or failure of the vehicle system may be displayed on the third region 515. Further, information displayed on the second region 513 may be exchanged with information displayed on the third region 515. As such, various modifications are possible.

Since the general configuration of this embodiment remains the same as the head-up display apparatus 1 integrated with the cluster according to the preceding embodiment of the present invention except for the first region 511, the second region 513 and the third region 515 formed in the combiner body 510, a duplicate description will be omitted herein.

The present invention provides a head-up display apparatus integrated with a cluster, in which a display unit and a combiner unit are disposed on a driver's field of vision, thus allowing a driver to check information required when driving.

Furthermore, the display unit and the combiner unit are integrated with each other, thus simplifying a structure.

Furthermore, the combiner unit is rotatably coupled to a cover unit, thus being capable of reducing space required when they are installed in a vehicle, and enhancing space utilization.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus comprising:
    a housing;
    a head-up display (HUD) device comprising an optical module installed in the housing, a HUD cover unit mounted over the optical module and the housing, and a HUD combiner coupled to the HUD cover unit and configured to display information using light from the optical module, wherein the HUD cover unit comprises a driver side that faces a driver seat; and
    a secondary display installed on the driver side of the HUD cover unit such that the secondary display is disposed over the housing when viewing from a driver who is sitting on the driver seat,
    wherein the HUD combiner is configured to move between a HUD display position and a HUD non-display position,
    wherein when the HUD combiner is at the HUD display position to display information thereon, the secondary display is disposed over the housing and under the HUD combiner when viewing from the driver sitting on the driver seat,
    wherein the secondary display comprises:
        a bracket coupled to the HUD cover unit;
        an optical substrate coupled to the bracket and configured to generate light,
        an optical tunnel through which the light irradiated from the optical substrate passes; and
        a panel covering the optical tunnel, and coupled to the mounting frame,
    wherein the secondary display is configured to display at least one of a warning light and a turn signal light,
    wherein the HUD device is configured to display at least one of a vehicle speed, a revolution per minute of an engine, a fuel condition and a vehicle status on the HUD combiner.

2. The apparatus of claim 1, wherein the HUD cover unit comprises:
    a mounting frame configured to support the secondary display;
    a cover body covering a top of the mounting frame; and
    a guide unit coupled to the mounting frame, and providing a path for light from a screen unit provided in the HUD cover unit.

3. The apparatus of claim 1, wherein the optical substrate comprises a light emitting diode (LED) substrate.

4. The apparatus of claim 1, wherein the panel has a structure of a touch panel.

5. The apparatus of claim 1, further comprising:
    a light generating unit installed inside the HUD cover unit and configured to emit light;
    a hinge configured to couple the HUD combiner to the HUD cover unit; and
    a combiner holder coupled with the HUD combiner and rotatably installed at the hinge.

6. The apparatus of claim 5,
    wherein a rotating shaft is provided on the hinge, and
    wherein an insert hole is formed in the combiner holder such that the rotating shaft is inserted into the insert hole.

7. The apparatus of claim 5, wherein the HUD combiner comprises:
    a first region formed under a central portion of the HUD combiner so that the light irradiated from the light generating unit reaches the first region;
    a second region formed above the first region so that the light reaches the second region;
    a third region formed on a left side of the second region so that the light reaches the third region; and
    a fourth region formed on a right side of the second region so that the light reaches the fourth region.

8. The apparatus of claim 7, wherein the first region is configured to display at least one of a vehicle speed, a revolution per minute (RPM) of an engine, a fuel condition, and a vehicle status.

9. The apparatus of claim 7, wherein the second region is configured to display a fault or failure of a vehicle system.

10. The apparatus of claim 7, wherein the third region is configured to display information about an advanced driver assistance system (ADAS).

11. The apparatus of claim 7, wherein the fourth region is configured to display information about an audio, video, and navigation (AVN) integrating module and vehicle setting.

12. The apparatus of claim 5, wherein the HUD combiner comprises:
    a first region formed in a central portion of the HUD combiner so that the light irradiated from the a light generating unit reaches the first region;
    a second region formed on a left side of the first region so that the light reaches the second region; and
    a third region formed on a right side of the first region so that the light reaches the third region.

13. The apparatus of claim 12, wherein information by light reaching the first region, the second region and the third region is changeable.

14. The apparatus of claim 12, wherein the second region is configured to display information about voice recognition and information about danger warning.

* * * * *